United States Patent [19]
Austin et al.

[11] Patent Number: 6,033,690
[45] Date of Patent: *Mar. 7, 2000

[54] PROCESS FOR PRE-CONDITIONING BREWER'S WORT WITH BEER FERMENTATION PRODUCTS AND PRODUCTION OF A BEER THEREFROM

[75] Inventors: Glen D. Austin, London; Thomas S. Rutledge, Sarnia; Jean-Pierre Auger, Kirkland, all of Canada

[73] Assignee: Labatt Brewing Company Limited, London, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,646

[22] Filed: Oct. 7, 1997

[51] Int. Cl.[7] .................................................. B01D 13/00
[52] U.S. Cl. ................................ 426/14; 426/16; 426/29
[58] Field of Search ................................ 426/14, 16, 29, 426/490, 592

[56] References Cited

U.S. PATENT DOCUMENTS

| | | | |
|---|---|---|---|
| 4,499,117 | 2/1985 | Bonneau | 426/592 |
| 4,532,140 | 7/1985 | Bonnome | 426/13 |
| 4,581,236 | 4/1986 | Bandel et al. | 426/14 |
| 4,590,085 | 5/1986 | Sidoti et al. | 426/582 |
| 4,664,918 | 5/1987 | Tilgner et al. | 426/14 |
| 4,681,767 | 7/1987 | Weiss | 426/14 |
| 4,746,518 | 5/1988 | Schur | 426/16 |
| 4,778,688 | 10/1988 | Matson | 426/425 |
| 4,810,505 | 3/1989 | Pachernegg | 426/16 |
| 4,816,407 | 3/1989 | Matson | 435/287 |
| 4,837,034 | 6/1989 | Owades et al. | 426/16 |
| 4,882,177 | 11/1989 | Dziondziak | 426/14 |
| 4,933,198 | 6/1990 | Lee et al. | 426/319 |
| 4,943,436 | 7/1990 | Ogden | 426/16 |
| 4,970,082 | 11/1990 | Huige et al. | 426/16 |
| 4,971,807 | 11/1990 | Schur et al. | 426/16 |
| 4,988,525 | 1/1991 | Gresch | 426/493 |
| 5,013,447 | 5/1991 | Lee et al. | 210/640 |
| 5,014,612 | 5/1991 | Gresch | 99/276 |
| 5,021,246 | 6/1991 | Sieben et al. | 426/13 |
| 5,075,123 | 12/1991 | Schwinghammer | 426/493 |
| 5,077,061 | 12/1991 | Zürcher | 426/16 |
| 5,143,526 | 9/1992 | Lee et al. | 55/158 |
| 5,242,694 | 9/1993 | Reuther | 426/16 |
| 5,266,337 | 11/1993 | Bärwald et al. | 426/15 |
| 5,273,762 | 12/1993 | Ahvenainen et al. | 426/11 |
| 5,281,430 | 1/1994 | Herron et al. | 426/490 |
| 5,294,450 | 3/1994 | Word et al. | 426/11 |

FOREIGN PATENT DOCUMENTS

| | | | |
|---|---|---|---|
| 1079517 | 8/1967 | United Kingdom | C12B 1/00 |

*Primary Examiner*—David Lacey
*Assistant Examiner*—Hao Mai
*Attorney, Agent, or Firm*—Levy & Grandinetti

[57] ABSTRACT

A process is disclosed for managing or controlling fermentation product profiles in a parallel pair of beer product streams in which a brewer's wort is fermented to produce a beer having fermentation products therein. The beer is passed along a first side of a semipermeable membrane, under selective fermentation product passing conditions, to transfer selected fermentation products across the membrane, and into an unfermented beer wort on a second side of that membrane. This procedure results in the production of an unfermented wort having a permeate-supplemented fermentation product profile and a fermented wort having a permeate-reduced product profile. The unfermented wort is then itself fermented to produce a second fermented wort. The second fermented wort has a combination of fermentation-supplemented and permeate-supplemented fermentation product profiles. The respective fermented worts are then finished and-packaged for subsequent distribution and consumption.

6 Claims, No Drawings

PROCESS FOR PRE-CONDITIONING BREWER'S WORT WITH BEER FERMENTATION PRODUCTS AND PRODUCTION OF A BEER THEREFROM

BACKGROUND OF THE INVENTION

1. Field of the Invention

The invention relates to the addition of beer fermentation products to brewer's wort. In particular, the invention relates to the use of ultrafiltration and, especially, to the use of dialysis in modifying a beer wort's constituent profile prior to the fermentation thereof.

2. Description of Related Art

The process of preparing fermented malt beverages, such as, beer, ale, porter, malt liquor, and other similar fermented alcoholic beverages, hereinafter referred to simply as "beer" for convenience, is historically well established. As practiced in modern breweries, the process, in brief, comprises preparing a "mash" of malt, usually with cereal adjuncts, and heating the mash to solubilize the proteins and convert the starch into sugar and dextrins. The insoluble grains are removed by filtering and then washed with hot water that is then combined with the soluble material. The resulting wort is boiled in a brew kettle to inactivate enzymes, sterilize the wort, extract desired hop components from added hops, and coagulate certain protein-like substances. The wort is then strained to remove spent hops and coagulum, cooled, pitched with yeast, and fermented. The fermented brew, known as "green" or "ruh" beer, is then aged or "lagered" and clarified, filtered, and carbonated to produce the desired beer. In a widely practiced high gravity brewing procedure, beer is brewed at a slightly elevated alcohol content of approximately seven percent to eight percent vol/vol alcohol content. This brew is then diluted to the desired value of alcohol or, for example, five percent vol/vol.

The use of semi-permeable membrane technologies in the production of brewery beverages is known in the art. Generally, such use is confined to the production of low alcohol beverages, as exemplified in a variety of issued patents.

U.S. Pat. No. 4,499,117 relates to a method consisting of subjecting a natural alcoholic liquid to three successive steps of non-denaturing physical fractionation. The first step is a molecular ultrafiltration that is performed under low pressure though a semipermeable ultrafilter, having a splitting threshold of between 30,000 and 1,000 and preferably around 10,000. The second step is a reverse osmosis step applied to the ultrafiltrate that is produced during the first step. In the second step, the ultrafiltrate is passed through a semipermeable membrane, the splitting threshold of which is between 500 and 100 and, preferably, about 250. The third step consists of evaporating and distilling under vacuum, at low temperature, the ultrafiltrate resulting from the second step. Natural beverages having a low alcohol content are thus obtained.

U.S. Pat. No. 4,532,140 discloses a method in which an alcoholic liquid obtained by fermenting a must or a wort is initially subjected to ultrafiltration or to reverse osmosis. This process obtains a permeate and a concentrate. The permeate contains a higher proportion of water and alcohol than the starting liquid. The concentrate contains a higher proportion of the substances that flavor the starting liquid. The permeate is then subjected to reverse osmosis using a membrane that is substantially impermeable to alcohol, while still being permeable to water. The concentrate from the second step is added to the concentrate from the first step to produce a liquid that has a higher concentration of alcohol than the starting liquid. The resulting liquid can be useable at the higher concentration as a beverage. Alternatively, the liquid can be used for transport and/or for storage with water being added to the liquid to restore the beverage substantially to its starting condition before being consumed.

U.S. Pat. No. 4,581,236 pertains to fermented beverages having reduced alcohol content. These beverages are made by causing the fermented beverage having a normal alcohol content, which is produced in the fermentation, to flow along one face of a dialysis membrane at a pressure differential below 5.0 bar. Simultaneously, a dialysate liquid that is substantially alcohol-free is passed along the other face of the dialysate membrane. An apparatus for performing the process comprises a housing in which two separate chambers are provided. Each chamber has separate inlet and outlet ducts. The inlet ducts are connected to separate feeding devices for liquids. Separate regulation devices are arranged for regulating the flow through each of the two chambers and means are provided for regulating the pressure differential between the two chambers.

U.S. Pat. No. 4,664,918 discloses a dialysis process wherein a fermented beverage is obtained The fermented beverage is conducted along one side of a dialysis membrane with a suitable dialysate fluid containing extract substances, such as alcohol-free fruit beverage and a fermented beverage from which the alcohol has been removed, flowing on the other side. This process simultaneously yields two finished drinks of low alcohol content. To improve the alcohol-reduced beverage, the extract-containing fluid is, in certain instances, conducted in circulation, and the alcohol is removed from the dialysate by vacuum distillation.

U.S. Pat. No. 4,681,767 describes a method for decreasing the alcohol content of alcohol-containing beverages, particularly wine or sparkling wine. This method uses a reverse osmosis process, in which extract substances are added to the dealcoholized beverage. In order to avoid the addition of foreign water to the beverage, the alcohol-containing permeate, which is obtained by reverse osmosis from the beverage subjected to dealcoholization, is distilled in a vacuum. The permeate water produced therefrom is re-fed to the beverage that has been subjected to the dealcoholization. The amount of permeate distillate removed from the beverage, which essentially consists of alcohol, is fed to the beverage, which has also been obtained by vacuum distillation from an additional beverage. In this manner, particularly high quality sparkling wine can be produced.

U.S. Pat. No. 4,816,407 discloses the production of low-ethanol wines and other alcoholic beverages by treating ordinary alcoholic beverages with membrane extraction methods. Semipermeable membranes and extraction fluids comprising either a nontoxic, water-immiscible organic solvent or an aqueous, membrane-impermeable solution with low-molecular weight are used under mild conditions to extract ethanol selectively from alcoholic beverages substantially intact. A complement of other organic constituents that contribute to the color, aroma, and taste of the beverage are left substantially intact. The method can be adapted to continuous processing of alcohol-containing beverages, in which an ethanol-rich product is continuously recovered from the organic or aqueous extraction fluid and the latter is continuously regenerated and subsequently recycled to the membrane extraction unit.

U.S. Pat. No. 4,933,198 relates to the production of low-ethanol wines, beer, distilled spirits, and other alcoholic beverages by treating ordinary alcoholic beverages with membrane extraction methods. Semipermeable membranes and gas-phase extraction fluids are employed to extract ethanol selectively into the gas-phase, while leaving substantially intact the complement of other organic constituents that contribute to the color, aroma, and taste of the beverage. Methods are provided for balancing the water activity of the gas-phase extraction fluid to be about equal to that in the beverage, so as to inhibit water transport across the membrane independent of the ethanol/water selectivity of the membrane.

U.S. Pat. No. 4,943,436 relates to beer production and intermediate products for use therein. In particular, the patent discloses a process for the production of a beer wherein, prior to fermentation, the wort is subjected to a separating technique. The separating technique produces one product, which is lower in fermentable low molecular weight components of the wort, in substantially the same concentration as the feedstock. Subsequently, the separated product is fermented to produce a beer.

U.S. Pat. No. 4,988,525 discloses a process for the selective removal of volatile substances from liquids, in which the initial liquid is fed to a crosscurrent diaphragm separation device. The permeate, consisting of water and volatile substances, is separated in this device by increased transdiaphragm pressure and concentration difference. The permeate is then fed into a further liquid-volatile separation device, in which the alcohol is removed by distillation. The permeate, now consisting only of water, salts, acids, and extracts, is fed back into the crosscurrent diaphragm separation device, where it flows through the permeate side countercurrent to the flow of the retentate.

U.S. Pat. No. 5,075,123 discloses a process and apparatus for removing alcohol from beverages. This process includes removing alcohol from the beverage to a dialysate by dialysis in a dialysis chamber. The alcohol is then removed from the dialysate by vacuum in a vacuum stripping column, wherein the dialysate is cooled in a heat exchanger and thereafter in a cooling device prior to entry of the dialysate into the dialysis chamber. The dialysate is heated in the heat exchanger and thereafter in a heater prior to removal of the alcohol from the dialysate by vacuum.

U.S. Pat. No. 5,143,526 discloses a method and an apparatus having applicability to the manipulation of the concentration, by partial depletion or enrichment, of one or more volatile components. The manipulation of the concentration of volatile components in a given liquid is performed while leaving the other volatile components in the liquid in a substantially undisturbed or unadulterated state.

There remains a need in the industry, however, for a process whereby the brewer can control the constituent fermentation product profile in the final, post-fermentation product according to predetermined criteria so that particular market tastes, for example, flavor, alcohol content, aroma, appearance, and the like, can be addressed and controlled in an efficacious manner heretofore unavailable in the art.

SUMMARY OF THE INVENTION

The present invention relates to the addition of beer fermentation products to brewer's wort. In particular, the invention relates to the use of ultrafiltration and, especially, to the use of dialysis in modifying a beer wort's constituent profile prior to the fermentation thereof.

A broad aspect of the invention is a process for adding products, especially fermentation products, to an unfermented beer wort and subsequently producing a fermented beer product therefrom. This permits enhanced control of the taste of the product by a relatively simple means that is primarily dependent upon the relative concentrations of a given component of the beer on the two sides of a membrane. More particularly, the invention relates to a process for the addition or substraction of at least one product to a beer wort. The process involves transferring the product across a semipermeable membrane, from a beer wort comprising the product on a first side of the membrane to a beer wort substantially free of the product on a second side of the membrane. This procedure produces a beer wort having a permeate-supplemented product profile on the second side of the membrane. This process can also be used to produce a beer.

Those skilled in the art will comprehend that travel across the membrane is not necessarily unidirectional and different components from opposite sides of the membrane can thereby be added or deleted to the product stream simultaneously or alternately, as desired. Thus, for example, compounds that detract from the desired taste of a given product can be removed and other compounds that improve such taste can be added.

DESCRIPTION OF THE PREFERRED EMBODIMENTS

A broad aspect of the invention is a process for adding products, especially fermentation products, to an unfermented beer wort and subsequently producing a fermented beer product therefrom. The process adds at least one product to a beer wort. The process involves transferring the product across a semipermeable membrane, from a beer wort comprising the product on a first side of the membrane to a beer wort substantially free of the product on a second side of the membrane. This procedure produces a beer wort having a permeate-supplemented product profile on the second side of the membrane.

A desirable embodiment of the invention involves passing a beer having fermentation products therein along a first side of a semipermeable membrane, under selective fermentation product passing conditions, to transfer selected fermentation products across the membrane and into an unfermented beer wort on a second side of the membrane. This procedure produces an unfermented wort having a permeate-supplemented fermentation product profile and, simultaneously, a fermented wort having a permeate-reduced fermentation product profile.

Another desirable embodiment of the invention further comprises the step of fermenting the unfermented wort having the permeate-supplemented fermentation product profile, to produce a fermented wort, having combined fermentation-supplemented and permeate-supplemented fermentation product profiles.

The invention can also include a process for adding fermentation products to an unfermented beer wort. This embodiment comprises transferring fermentation products across a semipermeable 1Membrane from a fermented beer wort on a first side of the membrane to an unfermented beer wort on a second side of the membrane. This procedure produces an unfermented wort having a permeate-supplemented fermentation product profile and a fermented wort having a permeate-reduced fermentation product profile.

An alternative embodiment of the invention is a process for adding fermentation products to an unfermented beer wort and subsequently producing a fermented beer product therefrom. The process of this embodiment involves transferring fermentation products across a semipermeable membrane, from a first fermented beer wort on a first side of the membrane, to an unfermented beer wort on a second side of the membrane. This transferring procedure is performed under predetermined fermentation product selective conditions to produce an unfermented wort having a predetermined permeate-supplemented fermentation product profile. The procedure further involves fermenting the unfermented wort, having the predetermined permeate-supplemented fermentation product profile, to produce a second fermented wort, having combined fermentation-supplemented and predetermined permeate-supplemented fermentation product profiles.

The preferred embodiment of the invention includes the step of fermenting a first brewer's wort to produce a first beer having fermentation products therein. The next step involves passing the first beer having fermentation products therein, along a first side of a semipermeable membrane, under selective fermentation product passing conditions, to transfer predetermined selected fermentation products across the membrane and into a second, unfermented, beer wort on a second side of the membrane. This step produces a second, unfermented, wort having a predetermined permeate-supplemented fermentation product profile. This embodiment further includes a step of fermenting the second, unfermented wort, having the predetermined permeate-supplemented fermentation product profile, to produce a second fermented wort, having combined fermentation-supplemented and predetermined permeate-supplemented fermentation product profiles.

A preferred embodiment of the invention includes a process having a preliminary fermenting step. A brewer's wort is fermented to produce a beer containing fermentation products. The beer produced from the fermenting step, together with its indigenous fermentation products, is passed along a first side of a semipermeable membrane and an unfermented beer wort is passed along the second side of the semipermeable membrane. This procedure is done under selective fermentation-product-passing conditions, so that selected fermentation products are transferred across the membrane from the beer wort containing the fermentation products to the unfermented beer wort on the other side of the membrane. Flow rates, temperatures, and other mass transfer conditions are dependent on the membrane chosen and the desired compound-specific mass transfer rates. Choosing appropriate conditions can be accomplished by those skilled in the art without undue experimentation. When this step is complete, it results in a still unfermented wort, but one that has a permeate-supplemented fermentation product profile.

Volatile fermentation products are those products that are transported at varying rates across the membrane. Mass transfer rates are related to individual component vapor pressures. Fermentation products that are transported across the membrane, in addition to ethanol, are alcohols, ketones, and esters. The transportable alcohols include methanol, n-propanol, isobutanol, 2-methylbutanol, 3-methylbutanol. The transportable ketones include acetone, diethyl ketone, methyl-isobutyl ketone. The transportable esters include methyl, ethyl, propyl, and butyl acetates, methyl and ethyl propionates, and methyl and ethyl butyrates.

Finally, the preferred process of the invention entails fermenting the unfermented wort. The unfermented wort still contains the exogenous, permeate-supplemented fermentation products. The fermenting of the unfermented wort produces a second fermented wort in which the resulting fermentation product profile is a combination of both indigenous and exogenous constituents.

In this connection, the present process comprises transferring fermentation products across a semipermeable membrane, from a fermented beer wort on a first side of that membrane, to an unfermented beer wort on a second side thereof. As a result of this activity, an unfermented wort is produced which has a permeate-supplemented fermentation product profile. Those skilled in the art recognize that a fermented wort having a permeate-reduced fermentation profile is simultaneously produced on the first side of the semipermeable membrane.

This newly produced (i.e., with its permeate-supplemented fermentation product profile) but still unfermented wort is then itself fermented. This second fermentation produces a second fermented wort having a combination of fermentation and permeate-supplemented fermentation product profiles.

Preferably, the above-described process of the invention is performed such that the fermentation products are transferred across the semipermeable membrane under predetermined fermentation-product-selective conditions. Such conditions realize a generally predetermined, permeate supplemented, fermentation product profile in the unfermented wort. The brewer is thereby enabled to deliberately engineer a constituent profile in the final, post-fermentation product to address particular market tastes. The collateral production of the first fermented beer can be similarly addressed to specific target markets. For example, the process provides collateral production of beers to satisfy the demand for low-alcohol beers in one market segment and for higher alcohol beers in another separate market segment.

An advantage of the process of the invention is the close similarity of the liquids on either side of the membrane. The similarity of these liquids permits the mass transport of different materials, such as the fermentation products.

It is possible that products, such as aromatics, can cross the membrane from the unfermented wort to the fermented beer wort. The direction of transport of a given constituent is dependent upon the characteristics of both the membrane and the components that are present. Generally, as the size of a molecule is decreased and/or its concentration is increased, the probability of its being transported across the membrane increases. If the membrane is hydrophobic, hydrophobic compounds are transported more easily. If the membrane is hydrophilic, hydrophilic compounds are transported more easily. Thus, the direction of travel, for example, "wort to beer" or "beer to wort" of a given constituent depends upon the membrane, the components, and the concentrations of the components.

The membranes used in the practice of the invention desirably have a high ethanol/congener selectivity. Specifically, desirable membranes are very permeable to ethanol and are permselective between ethanol and other organic components of the beverage. Those skilled in the art readily comprehend that membranes that are permeable to alcohol are also frequently permeable to water. The permeability of water to a membrane also affects the alcohol concentrations of the products on both sides of the semipermeable membrane, such as the fermented wort and the unfermented wort.

A number of types of membranes have potential applicability in the practice of the invention. The choice of a given membrane is often influenced by economic considerations, the compatibility of the membrane with the compound(s) to which it is permeable, and its availability in high surface area configurations. Membranes constructed of crosslinked or uncrosslinked polymers can be employed, as can elastomeric materials. Membranes known in the art for use in reverse osmosis processes can be employed because such processes require high water fluxes of polar permeants, such as water, across the membrane. Such membranes, as noted above, typically exhibit satisfactory permeability to alcohol.

Membranes that have the requisite permeability for the practice of the process of the invention are desirably thin, nonporous, and can be derived from polymers that are crosslinked or uncrosslinked, glassy, leathery or rubbery, and water swollen to various degrees. The literature contains numerous references to membranes of varied compositions and structures. Preferably, membranes that are relatively hydrophilic, such as those films that exhibit higher permeabilities to ethanol than to higher alcohols, have been found to be useful.

It is often desirable to pass molecules other than ethanol resulting from the fermentation or from the pre-fermentation processes across the membrane. Appropriate adjustments in the chemical and physical structure of the membrane can be required to pass these other molecules. This is a particularly important aspect of the present invention, since it permits a fine tuning of the product stream that can beneficially alter the taste and other desirable sensual aspects of the final beer. Those skilled in the art will be able to determine specific adjustments for a given need without undue experimentation.

In view of the above considerations, a number of membrane types are useful for the selective transport of fermentation products from the fermented beer on the first side of the membrane in the practice of the invention to the unfermented wort on the other side. For example, various aliphatic and aromatic polyamides, polyureas, polyetherureas, polyimides, polyoxazolines, polyetheraminotriazones, regenerated cellulose, cellulose acetate, cellulose triacetate, crosslinked polyvinyl alcohol, polyacrylonitrile and its copolymers, polybenzimidazole, and polybenzimidazolone, hydrophilic crosslinked vinyl polymers and copolymers, and ion exchange membranes with various counterions can be employed. Other preferred membranes are polytetrafluoroethylene (PTFE), polydimethylsiloxane (silicone) and polypropylene.

Any membrane geometry is potentially applicable for use with the invention. In one embodiment, a hollow-fiber module with high membrane area-to-module volume ratio can be used. The flow of alcoholic beverage can be directed through the lumen of the hollow fibers and the unfermented wort along the exterior shell of the fibers or vice versa. The specific configuration depends on the pressure capability, wettability, and porosity of the fibers, as well as on the hydrodynamic and mass transfer characteristics of the molecules containing them.

The invention has been described in detail with particular reference to its preferred embodiments, but it is understood that variations and modifications can be effected within the spirit and scope of the invention.

What is claimed is:

1. A dialysis process for transferring at least one product from a first beer wort to a second beer wort comprising:

transferring said product across a semipermeable membrane, from a first beer wort comprising said product on a first side of said membrane to a second beer wort substantially free of said product on a second side of said membrane, wherein one, of said beer worts has previously been fermented, whereby a permeate-supplemented product profile in said second beer wort and a permeate-reduced product profile in said first beer wort are produced and then fermenting the unfermented beer wort.

2. A dialysis process for adding at least one fermentation product to an unfermented beer wort comprising:

transferring the fermentation product across a semipermeable membrane, from a fermented beer wort on a first side of said membrane to an unfermented beer wort on a second side of said membrane, whereby an unfermented wort having a permeate-supplemented fermentation product profile and a fermented wort having a permeate-reduced fermentation product profile are produced and then fermenting the unfermented wort having said permeate-supplemented fermentation product profile, to produce a second fermented wort, having combined fermentation-supplemented and permeate-supplemented fermentation product profiles.

3. The process of claim 2 comprising transferring the at least one fermentation product across said semipermeable membrane under predetermined fermentation product selective conditions to impart a generally predetermined, permeate supplemented, fermentation product profile in said unfermented wort.

4. The process of claim 2 comprising transferring the at least one fermentation product across said semipermeable membrane under predetermined fermentation product selective conditions to impart a generally predetermined, permeate reduced, fermentation product profile in said fermented wort on the first side of said membrane.

5. A dialysis process for adding fermentation products to an unfermented beer wort and subsequently producing a fermented beer product therefrom, said process comprising:

(a) transferring fermentation products across a semipermeable membrane, from a first fermented beer wort on a first side of said membrane, to an unfermented beer wort on a second side of said membrane, under predetermined fermentation product selective conditions, whereby an unfermented wort having a predetermined permeate-supplemented fermentation product profile is produced; and (b) fermenting the unfermented wort having said predetermined permeate-supplemented fermentation product profile, to produce a second fermented wort, having combined fermentation-supplemented and predetermined permeate-supplemented fermentation product profiles.

6. A dialysis process comprising the steps of:

(a) fermenting a first brewer's wort to produce a first beer having fermentation products therein;

(b) passing said first beer having fermentation products therein, along a first side of a semipermeable membrane, under selective fermentation product passing conditions, to transfer predetermined selected fermentation products across said membrane and into a second, unfermented, beer wort on a second side of said membrane, whereby a second, unfermented, wort having a predetermined permeate-supplemented fermentation product profile is produced; and (c) fermenting the second, unfermented, wort having said predetermined permeate-supplemented fermentation product profile, to produce a second fermented wort, having combined fermentation-supplemented and predetermined permeate-supplemented fermentation product profiles.

* * * * *